United States Patent
Yamamoto et al.

(10) Patent No.: US 7,484,238 B2
(45) Date of Patent: Jan. 27, 2009

(54) METHOD AND APPARATUS FOR CONFIGURATION MANAGEMENT OF COMPUTER SYSTEM

(75) Inventors: Masayuki Yamamoto, Sagamihara (JP); Yasuyuki Mimatsu, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 10/868,901

(22) Filed: Jun. 17, 2004

(65) Prior Publication Data
US 2005/0240986 A1  Oct. 27, 2005

(30) Foreign Application Priority Data
Apr. 23, 2004  (JP)  ............... 2004-128126

(51) Int. Cl.
 *H04L 9/00* (2006.01)
 *H04L 9/32* (2006.01)
(52) U.S. Cl. .................. 726/1; 726/2; 726/3; 726/6
(58) Field of Classification Search ............... 726/1–7, 726/16–18
See application file for complete search history.

(56) References Cited

U.S. PATENT DOCUMENTS

| | | | |
|---|---|---|---|
| 5,991,771 A * | 11/1999 | Falls et al. ................ 707/202 |
| 6,636,981 B1 | 10/2003 | Barnett et al. ............... 714/4 |
| 7,340,505 B2 * | 3/2008 | Lisiecki et al. ............ 709/217 |
| 2003/0005119 A1 * | 1/2003 | Mercier et al. ............ 709/225 |
| 2004/0064729 A1 * | 4/2004 | Yellepeddy ................ 713/201 |
| 2004/0254936 A1 | 12/2004 | Mohamed ................... 707/10 |
| 2004/0260873 A1 | 12/2004 | Watanabe ................... 711/114 |

* cited by examiner

*Primary Examiner*—Hosuk Song
(74) *Attorney, Agent, or Firm*—Mattingly, Stanger, Malur & Brundidge, PC

(57) ABSTRACT

A management computer collects, from a storage subsystem via a management network, path definition information including the contents of a security setting made to a path accessible to a volume in the storage subsystem, and when the volume in the storage subsystem is an original volume having a replica volume, replica definition information of the original volume. Based on the replica configuration information thus collected from the storage subsystem, the replica relationship between the volumes is to be grasped. Then, based on the path definition information also collected from the storage subsystem, the contents of the path security setting are verified for the volumes under the same replica relationship, and the verification result is output. In such a structure, consistency verification can be easily done for the security setting of the original and replica volumes.

8 Claims, 16 Drawing Sheets

FIG. 3A
STORAGE SUBSYSTEM 2000a

2410

| PATH ID | PORT ID | LUN | VOLUME ID | SECURITY SETTING |
|---------|---------|-----|-----------|------------------|
| pa1 | port1 | 1 | va1 | YES (IPsec) |
| pa2 | port2 | 1 | va2 | YES (IPsec) |
| pa3 | port1 | 2 | va3 | NO |
| pa4 | port2 | 2 | va4 | NO |

2411 / 2412 / 2413 / 2414 / 2415

FIG. 3B
STORAGE SUBSYSTEM 2000b

2410

| PATH ID | PORT ID | LUN | VOLUME ID | SECURITY SETTING |
|---------|---------|-----|-----------|------------------|
| pb1 | port1 | 1 | vb2 | NO |

STORAGE SUBSYSTEM 2000a

2420

| REPLICA ID | ORIGINAL VOLUME ID | REPLICA VOLUME ID |
|---|---|---|
| IntraR-a1 | va1 | va2 |
| IntraR-a2 | va3 | va4 |

STORAGE SUBSYSTEM 2000b

2420

| REPLICA ID | ORIGINAL VOLUME ID | REPLICA VOLUME ID |
|---|---|---|
| IntraR-b1 | vb1 | vb2 |

| REPLICA ID | PRIMARY DEVICE ID | PRIMARY VOLUME ID | SECONDARY DEVICE ID | SECONDARY VOLUME ID | SECURITY SETTING |
|---|---|---|---|---|---|
| InterR-a1 | S1 | va1 | S2 | vb1 | YES (IPsec) |

2431, 2432, 2433, 2434, 2435, 2436

| DISCOVERY ID 3521 | STORAGE SUBSYSTEM ID 3522 | STORAGE SUBSYSTEM INFORMATION 3523 | IP ADDRESS 3524 |
|---|---|---|---|
| 1 | S1 | VENDOR A, STORAGE A | 100.100.100.103 |
| 2 | S2 | VENDOR A, STORAGE A | 100.100.100.104 |

| REPLICA RELATIONSHIP ID 3531 | VOLUME LIST (STORAGE SUBSYSTEM ID, VOLUME ID) 3532 | REPLICA ID LIST (STORAGE SUBSYSTEM ID, REPLICA ID) 3533 |
|---|---|---|
| 1 | (S1, va1), (S1, va2), (S2, vb1), (S2, vb2) | (S1, IntraR-a1), (S2, IntraR-b1), (S1, InterR-a1) |
| 2 | (S1, va3), (S1, va4) | (S1, IntraR-a2) |

| LOG ID 3541 | TIME AND DATE 3542 | CONTENTS 3543 |
|---|---|---|
| 1 | 2003/12/01 10:00:00 | PROCESS EXECUTION TO CONFIRM PATH SECURITY SETTING REPLICA RELATIONSHIP ID 1: SETTING INCONSISTENCY DETECTED SETTING (pa1, pa2, InterR-a1), NO SETTING (pb1) |
| 2 | 2003/12/01 10:01:00 | PROCESS EXECUTION TO CONFIRM PATH SECURITY SETTING REPLICA RELATIONSHIP ID 2: NO SETTING INCONSISTENCY DETECTED NO SETTING (pa3, pa4) |
| 3 | 2003/12/01 10:03:00 | SETTING CHANGE BY USER A REPLICA RELATIONSHIP ID 1 SECURITY SETTING CHANGE OF pb1 (NO → YES) |

FIG. 14

CONFIRMATION OF PATH SECURITY SETTING — 7002

SUMMARY OF CONFIRMATION RESULT:
TWO SETS OF REPLICA RELATIONSHIPS ARE CONFIRMED

7003

| REPLICA ID | CONFIRMATION RESULT OF PATH SECURITY SETTING | |
|---|---|---|
| 1 | SETTING INCONSISTENCY DETECTED | DETAILS — 7004 |
| 2 | NO SETTING INCONSISTENCY DETECTED | |

FIG. 15

REPLICA RELATION OF REPLICA ID 1

7005

STORAGE S1: pa1, pa2, va1, va2
STORAGE S2: pb1, vb1, vb2
Connection: InterR-a1

DETAILS OF SETTING INCONSISTENCY — 7006

| STORAGE SUBSYSTEM ID | VOLUME ID | PATH-ID | SECURITY SETTING | |
|---|---|---|---|---|
| S1 | va1 | pa1 | YES (IPsec) | CHANGE |
| S1 | va1 | InterR-a1 | YES (IPsec) | CHANGE |
| S1 | va2 | pa2 | YES (IPsec) | CHANGE |
| S2 | vb2 | pb1 | NO | CHANGE |

7007

| STORAGE SUBSYSTEM ID 3551 | VOLUME ID 3552 | PATH SECURITY POLICY 3553 |
|---|---|---|
| S1 | va5 | YES (IPsec) |

3550

METHOD AND APPARATUS FOR CONFIGURATION MANAGEMENT OF COMPUTER SYSTEM

CROSS-REFERENCES TO RELATED APPLICATIONS

This application relates to and claims priority from Japanese Patent Application No. 2004-128126, filed on Apr. 23, 2004, the entire disclosure of which is incorporated herein by reference.

BACKGROUND

It is related with a configuration management technology for computer systems and, more specifically, to a technology for verifying the consistency of a security setting made to volumes and their replicas.

DESCRIPTION OF THE RELATED ART

The technology disclosed in U.S. Pat. Publication No. 6,636,981 (hereinafter, Patent Document 1) is the one for problem identification and error classification in storage networks. Such identification and classification are done through detection of physical connections (topologies) among devices over a storage network, e.g., host computers, switches, and storage subsystems, using event notifications each coming from such devices.

The trend in a computer system configured by host computers, switches, and storage subsystems is that volume replication has been popular for the storage subsystem. Such volume replication is aimed for business data backup and emergency provisions, using inner and remote replication capabilities of the storage subsystem. Here, the volume denotes a storage region that is logically configured by at least one disk drive. The inner replication capability is used for volume replication in the same storage subsystem, and the remote replication capability is for volume replication in any different storage subsystems. FIG. 23 example shows replication utilizing such capabilities, i.e., an original volume 25000*a* in a storage subsystem 20000*a* is replicated utilizing the inner replication capability so that a replica 25000*b* is created in the same storage subsystem 20000*a*, and a replica 25000*c* is created in another storage subsystem 20000*b* utilizing the remote replication capability.

Another trend in the computer system is the increasing importance of the security management for paths among the host computers and the volumes, whether data in the volumes of the storage subsystems can be securely accessed from the host computers. In FIG. 23 example, the security setting is activated for a path between the original volume 25000*a* and the host computer 10000*a*.

Here, if the security setting for a path between a replica volume and the host computer accessing thereto is not equivalent in level to the security setting for a path to an original volume of the replica, the security level is degraded in the entire computer system. In FIG. 23 example, the security setting is activated for the path between the replica 25000*c* and the host computer 10000*c*, but not for the path between the replica 25000*b* and the host computer 10000*b*. This thus results in the lower security level in the entire computer system. In view thereof, considered here is a large complex-configured computer system including a number of host computers, switches, and storage subsystems. If an original volume is plurally replicated in such a computer system, with consideration given to the replica configuration, maintaining the consistency of the security setting among the original and the resulting replicas puts a heavy load on storage managers. Patent Document 1 gives no consideration to such a problem.

What is more, the storage managers have to make path security setting for themselves prior to path definition between the host computers and the volumes. Thus, the storage managers may mistakenly deactivate the security setting with the replica path definition even if the security setting is activated with the original path definition. Patent Document 1 gives no consideration to such a problem, either.

SUMMARY

The present invention is proposed in consideration of such problems.

In order to solve at least one of such problems, a first aspect of the present invention is directed to make a management computer go through a path security confirming process of verifying the consistency of path security setting. Here, the management computer is the one exercising management of a storage network, and the path security confirming process is done through comparison between an original path security and a replica path security.

A computer system of the first aspect is configured by at least a host computer, and at least a storage subsystem including at least a volume available for the host computer. The host computer and the storage subsystem are connected together over at least one storage network. In an exemplary method for configuration management of such a computer system of the first aspect, the management computer connected to the storage subsystem over a management network goes through the following steps. That is, a configuration information collecting step of collecting, from the storage subsystem, path definition information including the contents of a security setting made to a path for accessing to the volume in the storage subsystem, and when the volume is an original volume having a replica volume, replica configuration information of the original volume, a replica relationship grasping step of grasping a replica relationship between the volumes based on the replica configuration information collected from the storage subsystem, and a security state verifying step of verifying the contents of the security setting made to the path for the volumes under the same replica relationship based on the path definition information collected from the storage subsystem and outputting the verification result.

A second aspect of the present invention is directed to make a management computer that is exercising management of a storage network go through a path security policy updating process and a path defining process both at the time when a storage manager executes a replica configuration. The path security policy updating process is executed for reflecting the contents of an original path security policy to a replica path security, and the path defining process is executed for setting the security set to an original path to a replica path.

A computer system of the second aspect is configured by at least a host computer, and at least a storage subsystem including at least a volume available for the host computer. The host computer and the storage subsystem are connected together over at least a storage network. In an exemplary method for configuration management of such a computer system of the second aspect, the management computer connected to the storage subsystem over a management network goes through the following steps. That is, a replica configuration information accepting step of externally accepting replica configuration information of the volume via an input unit;

a security policy updating step of, when the volume having externally accepted the replica configuration information is an original volume, and when path security setting information is previously available for application to a path for accessing the volume, storing the path security setting information to a replica volume specified by the replica configuration information;

a path definition information accepting step of externally accepting path definition information of the volume via the input unit; and a path defining step of, when the path security setting information is previously available for the volume having externally accepted the path definition information, forwarding a request to apply the path definition information together with the path security setting information to the volume toward the storage subsystem including the volume.

Note here that other features of the present invention will become more apparent from the following detailed description of the present invention when taken in conjunction with the accompanying drawings.

BRIEF DESCRIPTION OF THE DRAWINGS

FIGS. 3A and 3B are both a diagram showing exemplary entry contents of a path table 2410;

FIGS. 4A and 4B are both a diagram showing exemplary entry contents of an inner replica table 2420;

FIG. 5 is a diagram showing exemplary entry contents of a remote replica table 2430;

FIG. 8 is a diagram showing exemplary entry contents of a replica relationship table 3530;

FIG. 9 is a diagram showing exemplary entry contents of a path security setting confirmation log 3540;

FIG. 14 is a diagram showing an exemplary screen displaying a button to accept an execution instruction for the path security confirming process, and a result summary of the process;

FIG. 15 is a diagram showing an exemplary screen displaying the path security setting in detail with which inconsistency is discovered as "YES";

FIG. 16 is a schematic diagram of a management computer 3000a;

FIG. 17 is a diagram showing exemplary entry contents of a path security policy table 3550;

FIG. 18 is a flow diagram illustrating a path security policy updating process to be executed by the management computer 3000a;

FIG. 21 is a flow diagram illustrating a path defining process to be executed by the management computer 3000a;

DESCRIPTION OF THE PREFERRED EMBODIMENTS

In the below, embodiments of the present invention are described. In the following description, a storage manager may be also referred to as user.

First Embodiment

Exemplified here as a first embodiment is a computer system in which a storage network is configured using an iSCSI (Internet Small Computer System Interface) between a host computer and a storage subsystem. Here, the storage network is not restricted to the iSCSI interface, and a Fibre Channel (FC) Interface is also a possible option.

1. System Configuration

Figure 1:
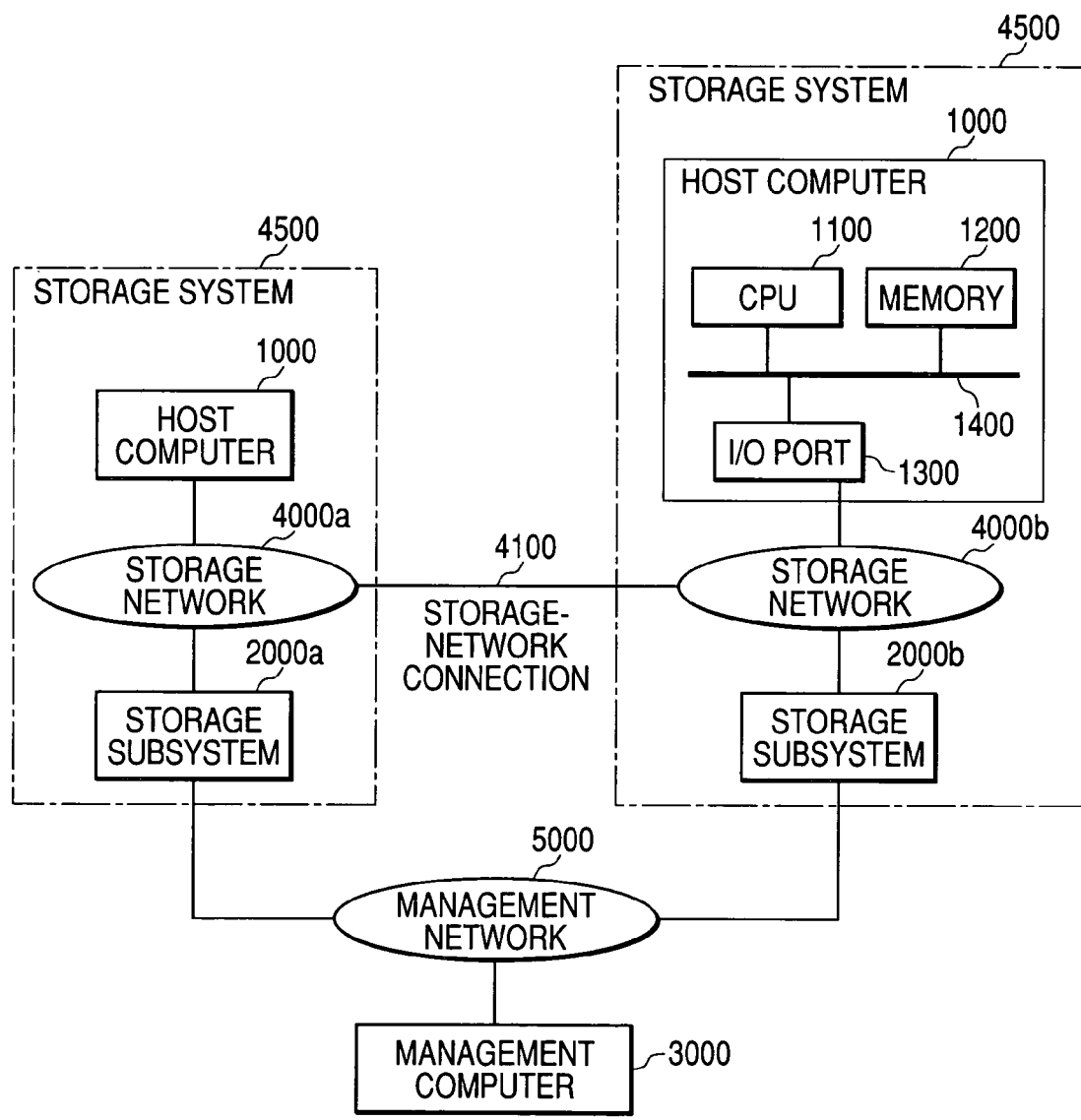
FIG. 1 is a schematic diagram of such a computer system of the first embodiment.

FIG. 1 is a schematic diagram of such a computer system of the first embodiment.

As shown in the drawing, the computer system of the present embodiment is provided with: a storage system 4500 including at least a host computer 1000 and a storage subsystem 2000 connected over a storage network 4000; and a management computer 3000 connected to the storage subsystem 2000 over a management network 5000 exemplified by an IP network.

In this example, the storage system 4500 may be plurally provided. If plurally provided, the storage network 4000 of the storage system 4500 may be connected to another storage network 4000 of any other storage system 4500 to execute a remote replica capacity using a private line, or VPN (Virtual Private Network), i.e., storage-network connection. In FIG. 1, two storage networks 4000a and 4000b are connected together through a storage-network connection 4100. This configuration allows the storage subsystem 2000a to create its own replica to the storage subsystem 2000b utilizing the remote replica capability.

Over the storage network 4000, the host computer 1000 makes access to the storage subsystem 2000 for data reading and writing therefrom. The host computer 1000 is provided with a CPU 1100, memory 1200, an I/O port 1300 for connection to the storage network 4000, and an internal bus 1400 for connecting the components 1100 to 1300 together. Although not shown, the memory 1200 has previously stored an OS (Operating System), and an application program for executing a data process, including access to the storage subsystem 2000. By the CPU 1100 executing these programs, volume access is made to the storage subsystem 2000, and data reading and writing is done to the volume(s).

Figure 2:
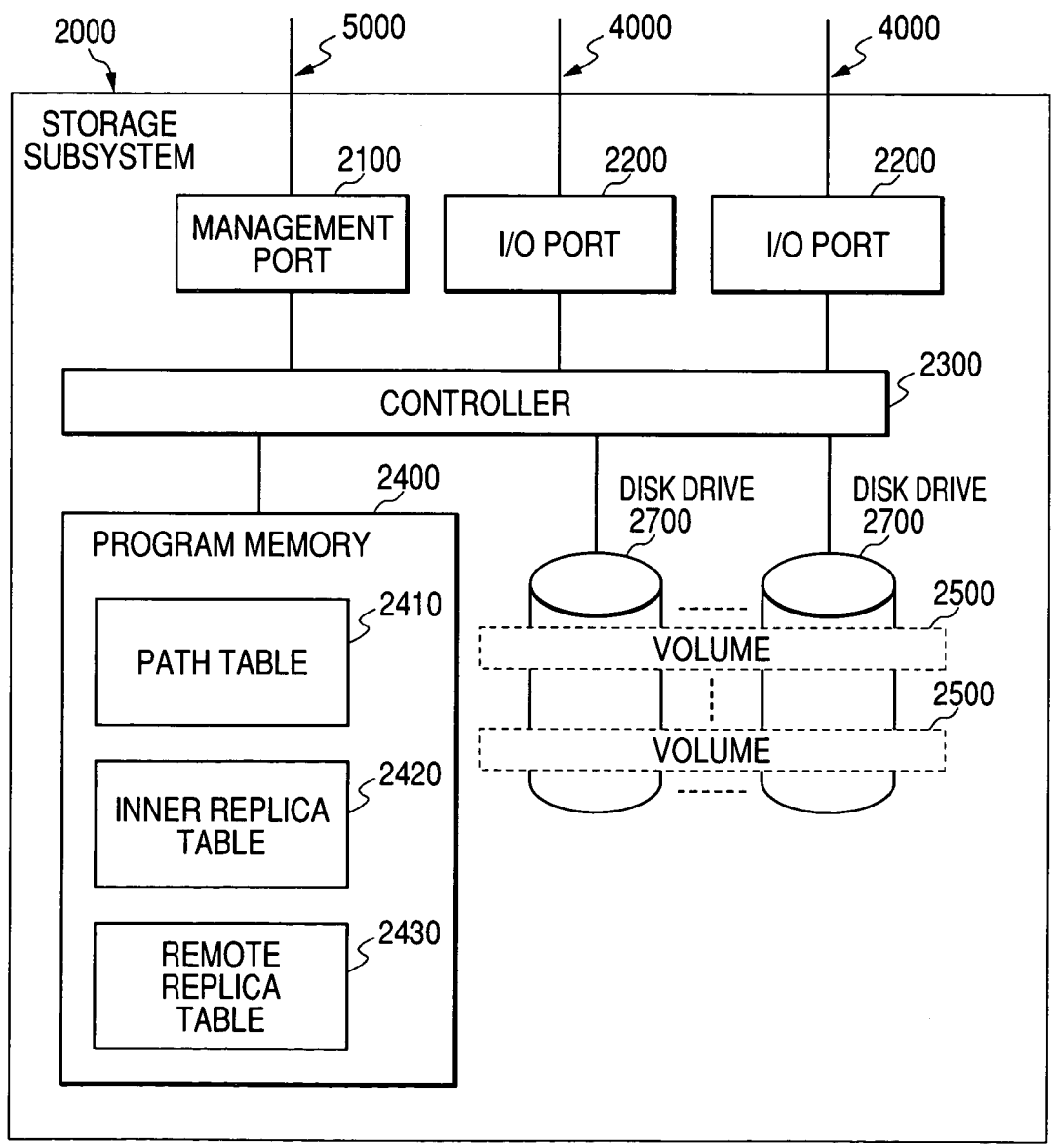
FIG. 2 is a schematic diagram of a storage subsystem 2000.

The storage subsystem 2000 includes at least a volume that is available for the host computer 1000. FIG. 2 is a schematic diagram of the storage subsystem 2000. As shown in the drawing, the storage subsystem 2000 is provided with a management port 2100 for connection to the management network 5000; at least an I/O port 2200 for connection to the storage network 4000, a controller 2300 for exercising control inside over the storage subsystem 2000; memory 2400 for use by the controller 2300; and at least a disk drive 2700 including at least a volume 2500.

The memory 2400 includes three tables of a path table 2410, an inner replica table 2420, and a remote replica table 2430. Specifically, the path table 2410 includes management information of a path being a logical data communications channel between the host computer 1000 and the volume 2500. The inner replica table 2420 includes management information about the inner replica capability of the storage subsystem 2000. The remote replica table 2430 includes management information about the remote replica capability of the storage subsystem 2000.

FIGS. 3A and 3B are both a diagram showing exemplary entry contents of the path table 2410. As shown in the drawings, the path table 2410 has an entry for every path, and the entry includes five fields 2411 to 2415. In detail, the field 2411 lists path IDs for unique path identification in the storage subsystem 2000. The field 2412 lists I/O port IDs to show which I/O port 2200 is assigned to the identified path, and the field 2413 lists SCSI logical unit numbers (LUNs) to show which LUN is assigned to the identified path. The field 2414 lists volume IDs each being a volume identifier assigned to the identified path, and the field 2415 lists the state of path security setting.

Here, the field 2415 listing the state of path security setting indicates, specifically, values each denoting whether the corresponding path is defined by the security setting such as IPsec under RFC2401. These values are defined by the controller 2300 at the time of user's path setting.

The path table 2410 of FIG. 3A is the one belonging to the storage subsystem 2000a. In this example, the storage subsystem 2000a has four paths each having a path ID of "pa1", "pa2", "pa3", or "pa4". The path table 2410 of FIG. 3B belongs to the storage subsystem 2000b. In this example, the storage subsystem 2000b has a path with a path ID of "pb1".

FIGS. 4A and 4B are both a diagram showing exemplary entry contents of the inner replica table 2420. As shown in the drawings, the inner replica table 2420 is provided with an entry every time a new replica relationship is established after the inner replica process is through. The entry includes three fields 2421 to 2423. To be specific, the field 2421 lists replica IDs for uniquely identifying the inner replica relationship in the storage subsystem 2000. The field 2422 lists volume IDs each being an identifier of an original volume, and the field 2423 lists volume IDs each being an identifier of a replica volume.

The inner replica table 2420 of FIG. 4A is the one belonging to the storage subsystem 2000a. In this example, the storage subsystem 2000a has two inner replica relationships denoted by, respectively, the replica IDs of "IntraR-a1" and "IntraR-a2". The inner replica table 2420 of FIG. 4B belongs to the storage subsystem 2000b. In this example, the storage subsystem 2000b has an inner replica relationship denoted by the replica ID of "IntraR-b1".

FIG. 5 is a diagram showing exemplary entry contents of the remote replica table 2430. As shown in the drawing, the remote replica table 2430 is provided with an entry every time a new replica relationship is established after the remote replica process is through. Here, the replica relationship is the one established between the storage subsystem 2000 including the original volume (hereinafter, original storage subsystem) and another storage subsystem 2000 including a volume replicated from the original volume (hereinafter, replica storage subsystem). The entry has six fields 2431 to 2436. Specifically, the field 2431 lists replica IDs for uniquely identifying the remote replica relationship established between the original storage subsystem 2000 and the replica storage subsystem 2000. The field 2432 lists storage subsystem IDs each being an identifier of the original storage subsystem 2000, and the field 2433 lists volume IDs each being an identifier of the original volume. The field 2434 lists storage subsystem IDs each being an identifier of the replica storage subsystem 2000, and the field 2435 lists volume IDs each being an identifier of the replica volume. The field 2436 lists the state of security setting of a remote replica path, i.e., path between the original and replica volumes.

Here, the field 2436 listing the state of path security setting indicates, specifically, values each denoting whether the security setting such as IPsec is applied to the corresponding path. These values are defined by the controller 2300 automatically, or responding to a user's instruction at the time of replica creation by the remote replica process. For automatic value definition, the controller 2300 may inquire software in charge of configuration management of computer system about the configuration of the storage-network connection 4100. Then, the controller 2300 may perform value definition in accordance with the inquiry result.

The remote replica table 2430 of FIG. 5 is the one belonging to the storage subsystem 2000a. In this example, the storage subsystem 2000a has the remote replica relationship indicated by a replica ID of "InterR-a1". With the remote replica relationship for the entry, the original volume is the volume 2500 (identifier: va1) of the storage subsystem 2000a (identifier: S1), and the replica volume is a volume (identifier: vb1) of the storage subsystem 2000b (identifier: S2). The IPsec security setting is applied to the path between these volumes.

The controller 2300 executes control over a data transferring process between the host computer 1000 and the volumes in accordance with the path table 2410. The controller 2300 also exercises control over a copying process (inner replica process) to be executed to a volume replicated in the same storage subsystem 2000 from the original volume in accordance with the inner replica table 2420, and a copying process (remote replica process) to be executed to a volume replicated from the original volume into another storage subsystem 2000 in accordance with the remote replica table 2430. When the security setting is applied to the path to any volume, the security protocol, e.g., IPsec, is utilized for volume access through such a path from the host computer 1000 or any other storage subsystem 2000.

Figures 6, 7:
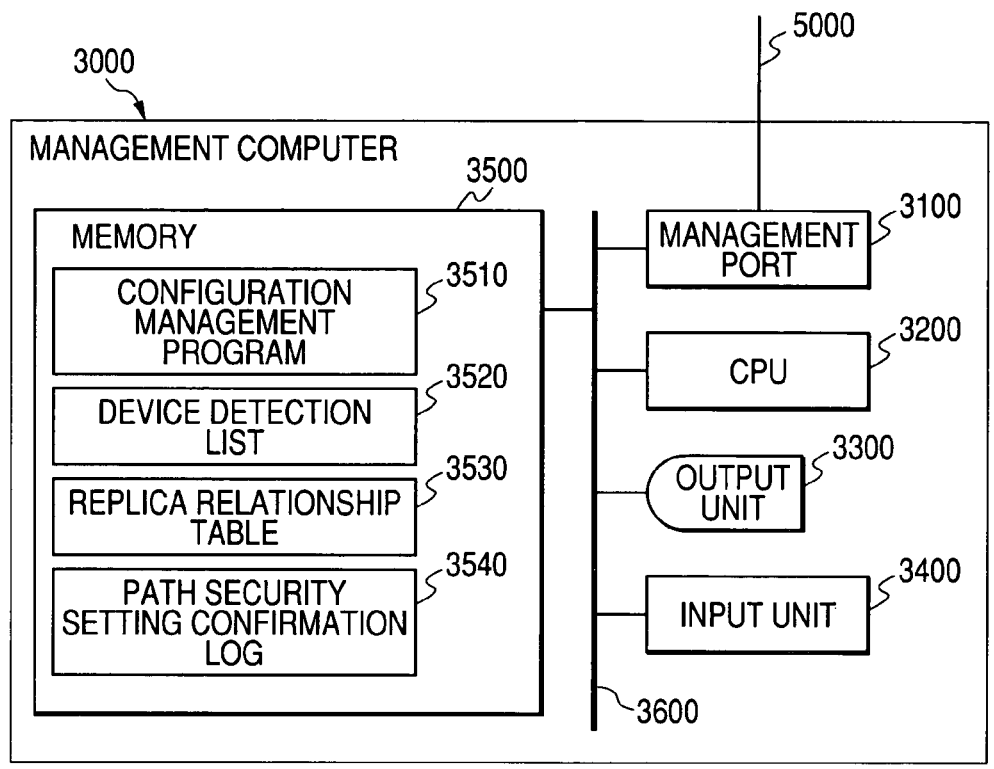
FIG. 6 is a schematic diagram of a management computer 3000.
FIG. 7 is a diagram showing exemplary entry contents of a storage subsystem discovery list 3520.

The management computer 3000 verifies the consistency of the path security setting between the original and replica volumes, and outputs the result (path security confirming process). FIG. 6 is a schematic diagram of the management computer 3000. As shown in the drawing, the management computer 3000 is provided with: a CPU 3200; memory 3500; a management port 3100 for connection to the management network 5000; an output unit 3300 exemplified by a display; an input unit 3400 exemplified by a keyboard or a mouse; and an inner bus 3600 for mutual connection between these components 3100 to 3500.

The memory 3500 has previously stored an OS (not shown), a configuration management program 3510 for executing the above-described path security confirming process, a storage subsystem discovery list 3520, a replica relationship table 3530, and a path security setting confirmation log 3540.

The storage subsystem discovery list 3520 stores configuration information of every storage subsystem 2000 included in the computer system. FIG. 7 is a diagram showing exemplary entry contents of the storage subsystem discovery list 3520. As shown in the drawing, the storage subsystem discovery list 3520 is provided with an entry for every storage subsystem 2000 being a discovery object in the computer system (hereinafter, discovery storage subsystem). The entry has four fields 3521 to 3524. Specifically, the field 3521 lists discovery IDs for unique entry identification. The field 3522 lists storage subsystem IDs each being an identifier of the discovery storage subsystem 2000, and the field 3523 lists storage subsystem information of the corresponding discovery storage subsystem 2000, e.g., vendor name, and model type. The field 3524 lists addresses for connection to a management port 2200 of the corresponding discovery storage subsystem 2000. In the present embodiment, the management network 5000 is exemplified by the IP network, and thus listed in the field 3524 are IP addresses.

In the example, the storage subsystem discovery list 3520 of FIG. 7 is provided with two entries; one is for the storage subsystem 2000a (identifier: S1), and the other is for the storage subsystem 2000b (identifier: S2). The storage subsystems 2000a and 2000b are those included in the computer system. Such entries of the storage subsystem discovery list 3520 are previously provided by a user, or provided through automatic acquisition of information about the respective storage subsystems 2000 using name services and others on the management network 5000.

The replica relationship table 3530 stores the replica relationships those having been confirmed by the path security confirming process. FIG. 8 shows exemplary entry contents of the replica relationship table 3530. As shown in the drawing, the replica relationship table 3530 is provided with an entry for every replica relationship having been confirmed through the path security confirming process. The entry has three fields 3531 to 3533. Specifically, the field 3531 lists replica relationship IDs each being an identifier for uniquely identifying the replica relationship. The field 3532 lists various information about any corresponding volumes under the replica relationship, e.g., storage subsystem ID, and volume ID. The field 3533 lists various information about inner and remote replicas, e.g., storage subsystem ID, and replica ID. The information listed in the field 3533 is used to determine that the volumes in the field (volume list) 3532 are those under the replica relationship. As to the replica relationship table 3530, detailed description will be given below for its creation and usage.

The path security setting confirmation log 3540 stores the consistency state of the path security having been confirmed through the path security confirming process. FIG. 9 shows exemplary entry contents of the path security setting confirmation log 3540. As shown in the drawing, the path security setting confirmation log 3540 is provided with an entry (log) every time the path security confirming process is executed. The entry has three fields 3541 to 3543. In detail, the field 3541 lists log IDs for unique log identification. The field 3542 lists times and dates when the path security confirming process is executed, and times and dates of user's operation relating to the process execution. The field 3543 lists the log contents, which specifically include the results of the path security confirming process, i.e., consistency state of the security setting, and details of security setting changes made associated with the process results.

1. Path Security Confirming Process

Described next is the path security confirming process to be executed by the management computer 3000.

Figure 10:
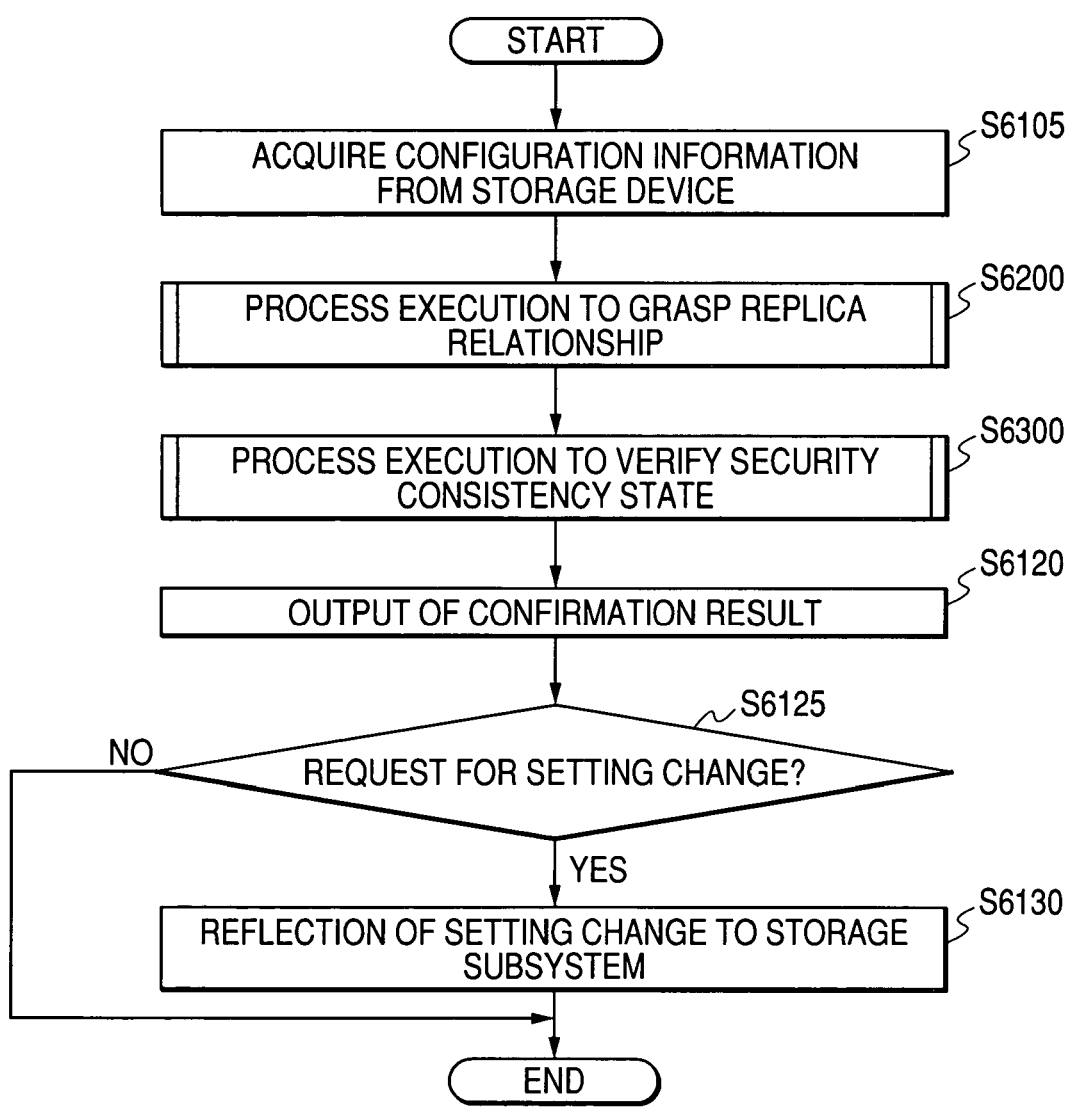
FIG. 10 is a flow diagram illustrating a path security confirming process to be executed by the management computer 3000.

FIG. 10 is a flow diagram illustrating such a path security confirming process by the management computer 3000. This flow is started, in the management computer 3000, responding to the CPU 3200 executing the configuration management program 3510 stored in the memory 3500.

First, the CPU 3200 acquires the configuration information of the storage subsystems 2000 in the computer system (Step S6105). More in detail, the CPU 3200 defines the storage subsystems 2000 by their own address using the storage subsystem discovery list 3520. Then, a request is forwarded via the management port 3100 to the storage subsystems 2000 for their configuration information. In the storage subsystems 2000, after receiving such a request from the management computer 5000, the controllers 2300 each create thus requested configuration information including the information of the path table 2410, the inner replica table 2420, and the remote replica table 2430 stored in the memory 2400. The resulting configuration information is forwarded to the management computer 3000. In such a manner, the CPU 3200 of the management computer 3000 receives the configuration information from the storage subsystems 2000.

Using the configuration information received from the storage subsystems 2000 as such, the CPU 3200 goes through a replica relationship grasping process to create the replica relationship table 3530 (Step S6200). Details of the replica relationship grasping process are left for later description.

Then, for every replica relationship, i.e., for every entry stored in the replica relationship table 3530, the CPU 3200 goes through a security consistency state verifying process for consistency verification of the path security setting for each volume (Step S6300). Details of the security consistency state verifying process are left for later description.

The CPU 3200 then outputs, to the output unit 3300, the consistency result of the path security setting verified for the respective replica relationships (Step S6120). The CPU 3200 then starts accepting a user's request via the input unit 3400 for changing the path security setting verified as inconsistent (Step S6125). Here, the expression of "inconsistent" means that the volume paths under the replica relationship have each varying path security setting.

In Step S6125, when received is a user's request not to change the path security setting, the procedure ends the path security confirming process. On the other hand, when a user's request is asking for changing the path security setting, the corresponding path is changed in its path security setting (Step S6130). Then, the procedure ends the path security confirming process. More in detail, to change the path security setting of the path, a request is forwarded via the management port 3100 to the corresponding storage subsystem 2000. The request is the one asking for changing the path security setting, including path specification telling which path. After receiving such a request coming from the management computer 3000 via the management port 2100, the controller 2300 of the storage subsystem 2000 searches the path table 2410 in the program memory 2400 for an entry of the path specified by the request. Then, in thus found entry, the controller 2300 accordingly changes the security setting state in the field 2415.

Note that, in this flow, the path security setting is changed if the user's request indicates "YES" for a change. Alternatively, the CPU 3200 may automatically make such a change in accordance with the configuration management program 3510. More specifically, if any inconsistent replica relationship is discovered by the security consistency state verifying process, the CPU 3200 may refer to every path for the volumes under the inconsistent replica relationship. If finding any path with which the path security setting is activated, the CPU 3200 may change the path security setting of the storage subsystem in such a manner as to activate the security setting for any other paths.

Figure 11:
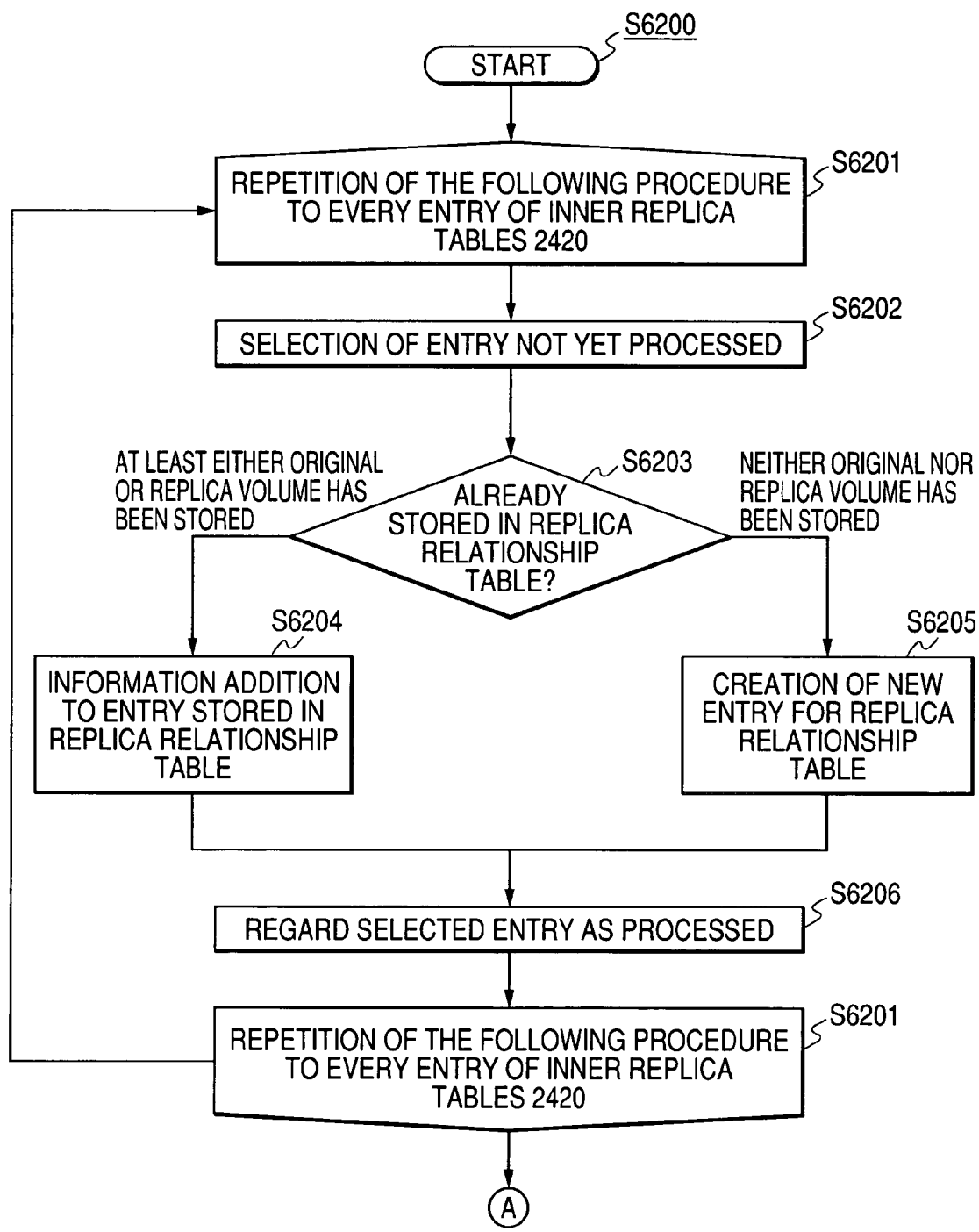
FIG. 11 is a flow diagram illustrating a replica relationship grasping process of Step S6200 in FIG. 10.
Figure 12:
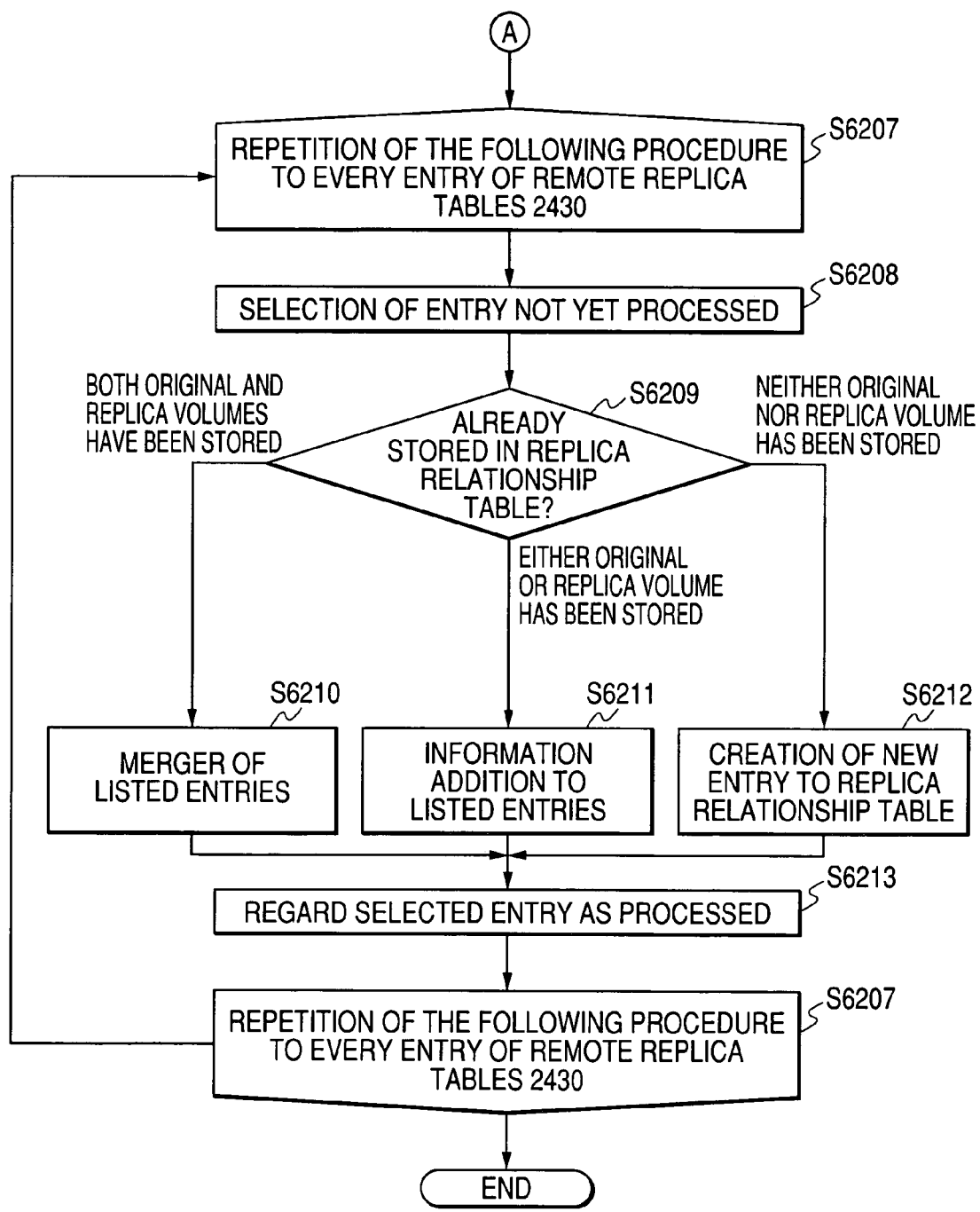
FIG. 12 is another flow diagram illustrating the replica relationship grasping process of Step S6200 in FIG. 10.

FIGS. 11 and 12 are both a flow diagram illustrating the replica relationship grasping process of Step S6200 of FIG. 10.

The CPU 3200 repeats the procedure from Steps 6202 to 6206 for every entry in the inner replica tables 2420 acquired from the storage subsystems 2000 in Step S6105 of FIG. 10 (Step S6201).

The CPU 3200 first selects a not-yet-processed entry from all of the acquired inner replica tables 2420, and thus selected entry is set as a first target entry (Step S6202).

The CPU 3200 then refers to the first target entry to see whether its original volume ID and replica volume ID have been already stored in the replica relationship table 3530 in the memory 3500 (Step S6203).

To be more specific, the CPU 3200 checks the field 3532 of the replica relationship table 3530 to see whether the set of the storage subsystem ID of the storage subsystem 2000 to which the inner replica table 2420 including the first target entry belongs (hereinafter, target storage subsystem), and the volume ID of the original volume listed in the field 2422 of the first target entry is included. Similarly, the CPU 3200 checks the field 3532 of the replica relationship table 3530 to see whether the set of the storage subsystem ID of the target storage subsystem 2000, and the volume ID of the replica volume listed in the field 2423 of the first target entry is included.

In Step S6203, when at least either the original or replica volume is already stored as the entry of the replica relationship table 3530, the CPU 3200 additionally provides information to the entry (Step S6204). Hereinafter, such an entry is referred to as listed entry. Specifically, the information additionally provided here includes the volume ID of the replica volume (or original volume) having the inner replica relationship with the original volume (or replica volume) listed to the entry, and the storage subsystem ID of the target storage subsystem 2000. Such information set is entered into the field 3532 of the listed entry. Also to the field 3533 of the listed entry, information set is provided, i.e., the replica ID listed to the field 2421 of the first target entry, and the storage subsystem ID of the target storage subsystem.

In Step S6203, when neither the original nor replica volume is stored in the replica relationship table 3530, the CPU 3200 creates a new entry to the replica relationship table 3530. (Step S6205)

In thus newly created entry, field listing is made as follows. That is, the field 3531 is listed with a unique identifier that is newly created as the replica relationship ID. The field 3532 is listed with a set of the storage subsystem ID of the target storage subsystem 2000 and the volume ID of the original volume of the first target entry, and a set of the storage subsystem ID of the target storage subsystem 2000 and the volume ID of the replica volume of the first target entry. The field 3533 is listed with the storage subsystem ID of the target storage subsystem 2000 and the replica ID of the first target entry.

After Step S6204 or S6205 is through, the CPU 3200 regards the first target entry as having been processed (Step S6206), and the procedure returns to Step S6201. Then, after Steps S6202 to S6206 are through with the entries of the inner replica tables 2420 acquired from the storage subsystems 2000 in Step S6105 of FIG. 10, the procedure goes to Step S6207.

In Step S6207, the procedure repeats Steps S6208 to S6213 for the entries of all the remote replica tables 2430 acquired from the storage subsystems 2000 in Step S6105 of FIG. 10.

The CPU 3200 first selects a not-yet-processed entry from all of the acquired remote replica tables 2430, and thus selected entry is set as a second target entry (Step S6208).

The CPU 3200 then refers to the second target entry to see whether its original volume ID and replica volume ID have been already stored in the replica relationship table 3530 in the memory 3500 (Step S6209).

To be more specific, the CPU 3200 checks the field 3532 of the replica relationship table 3530 to see whether the set of the volume ID of the original volume listed in the field 2433 of the second target entry and the storage subsystem ID of the storage subsystem 2000 to which the original volume listed in the field 2432 belongs is included. Similarly, the CPU 3200 checks the field 3532 of the replica relationship table 3530 to see whether the set of the volume ID of the replica volume listed in the field 2435 of the second target entry and the storage subsystem ID of the storage subsystem 2000 to which the replica volume listed in the field 2434 belongs is included.

In Step S6209, when the replica relationship table 3530 is already storing both the entry listing the original volume in the field 3532 and the entry listing the replica volume in the field 3532, the CPU 3200 merges those entries into one (Step S6210).

In detail, three processes are to be executed. In the first process, to the field 3532 of the entry listing the original volume in the field 3532, the value of the field 3532 of the entry listing the replica volume in the field 3532 is entered. In the second process, to the field 3533 of the entry listing the original volume in the field 3532, the value of the field 3533 of the entry listing the replica volume in the field 3532 is entered. In the third process, the entry listing the replica volume in the field 3532 is deleted from the replica relationship table 3530.

In Step S6209, when the replica relationship table 3530 is storing either the entry listing the original volume in the field 3532 or the entry listing the replica volume in the field 3532, the CPU 3200 additionally provides information to the listed entry (Step S6211).

Specifically, when the replica relationship table 3530 is already storing the entry listing the original volume in the field 3532, the field 3532 of the listed entry is provided with information including the volume ID of the replica volume listed in the field 2435 of the second target entry, and the storage subsystem ID of the storage subsystem 2000 to which the replica volume belongs. The field 3533 of the listed entry is provided with information including the replica ID listed in the field 2431 of the second target entry, and the storage subsystem ID of the storage subsystem 2000 to which the original volume listed in the field 2432 belongs.

When the replica relationship table 3530 stores neither the entry listing the original volume in the field 3532 nor the entry listing the replica volume in the field 3532, the CPU 3200 creates a new entry to the replica relationship table 3530 (Step S6212).

In thus newly created entry, field listing is made as follows. That is, the field 3531 is listed with a unique identifier that is newly created as the replica relationship ID. The field 3532 is listed with the volume ID of the original volume listed in the field 2432 of the second target entry, and the storage subsystem ID of the storage subsystem 2000 to which the original volume listed in the field 2433 belongs. Similarly, the field 3532 is listed with the volume ID of the replica volume listed in the field 2434 of the second target entry, and the storage subsystem ID of the storage subsystem 2000 to which the replica volume listed in the field 2435 belongs. The field 3533 is listed with the storage subsystem ID of the storage subsystem 2000 to which the original volume listed in the field 2433 belongs, and the replica ID listed in the field 2431 of the second target entry.

After any of Steps 6210 to 6212 is through, the CPU 3200 regards the second target entry as having been processed (Step S6213), and the procedure returns to Step S6207. Then, after Steps S6208 to S6213 are through with the entries of the remote replica tables 2430 acquired from the storage subsystems 2000 in Step S6105 of FIG. 10, the procedure ends the replica relationship grasping process. In this manner, created is such a replica relationship table 3530 as shown in FIG. 8.

Figure 13:
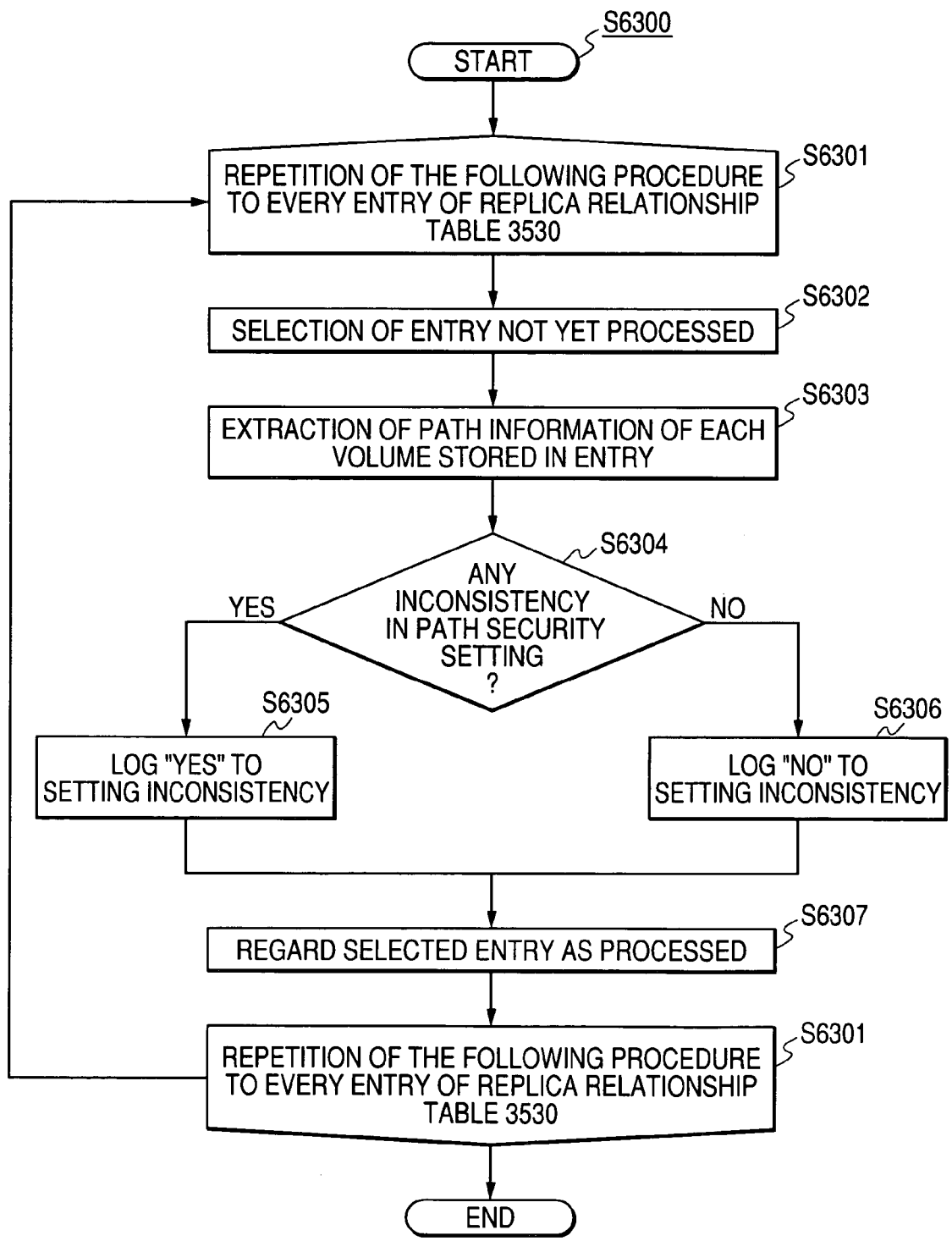
FIG. 13 is a flow diagram illustrating a security consistency state verifying process of Step S6300 in FIG. 10.

FIG. 13 is a flow diagram illustrating the security consistency state verifying process in Step S6300 of FIG. 10.

The CPU 3200 repeats the procedure from Steps 6302 to 6307 for every entry in the replica relationship table 3530 in the memory 3500 (Step S6301).

The CPU 3200 first selects a not-yet-processed entry from the replica relationship table 3530, and thus selected entry is set as a third target entry (S6302).

Then, from the path tables 2410 and the remote replica tables acquired from the storage subsystems 2000 in Step S6105 of FIG. 10, the CPU 3200 acquires path information of the volumes whose volume IDs are listed in the field 3532 of the third target entry (Step S6303).

Specifically, for every information set of the storage subsystem ID and the volume ID listed in the field 3532 of the third target entry, the path table 2410 acquired from the storage subsystem 2000 identified by the storage subsystem ID found in the sets is referred to for entry extraction. Here, extracted is the entry of the path whose volume ID is listed in the field 2414. Further, for every set of the storage subsystem ID and the replica ID listed in the field 3533 of the third target entry, if the replica ID is indicating the remote replica; the remote replica table 2430 acquired from the storage subsystem 2000 identified by the storage subsystem ID of the set is referred to for entry extraction. Here, extracted is the entry of the remote replica whose replica ID is listed in the field 2431. The reason for extracting also the entry of the remote replica is to check the path security setting of the remote replica.

Next, the CPU 3200 refers to the path information for every volume acquired in Step S6303 to see whether the path security setting shows any inconsistency (Step S6304).

To be specific, the CPU 3200 scans the field 2415 of the entry for the extracted path, and the field 2436 of the entry for the extracted remote replica to see whether any variation is observed in the security setting.

Herein, Steps 6302 to S6304 are described in detail while exemplifying a case where the tables 2410, 2420, and 2430 for the storage subsystems 2000a and 2000b have such entry contents as shown in FIGS. 3 to 5, and the tables 3520 and 3530 of the management computer 3000 have such entry contents as shown in FIGS. 7 and 8.

In the replica relationship table 3530 of FIG. 8, two volumes 2500 (volume ID: va1, va2) of the storage subsystem 2000a (storage subsystem ID: S1) have the replica relationship (entry) with two volumes 2500 (volume ID: vb1, vb2) of the storage subsystem 2000b (storage subsystem ID: S2). Here, the replica relationship is identified by the replica relationship ID1. Once Step S6302 is executed against the entry, extracted are three paths (path ID: pa1, pa2, replica ID: InterR-a1) of the storage subsystem 2000a (storage subsystem ID: S1), and a path (path ID: pb1) of the storage subsystem 2000b. After Step S6303 is executed against these paths, three paths (path ID: pa1, pa2, replica ID: InterR-a1) have "YES" for security setting, and the path (path ID: pb1)

has "NO" for security setting. Therefore, a determination is made that the security setting is inconsistent.

On the other hand, two volumes 2500 (volume ID: va3, va4) of the storage subsystem 2000a (storage subsystem ID: S1) have the replica relationship (entry) identified by the replica relationship ID2. Once Step S6302 is executed against the entry, extracted are two paths (path ID: pa3, pa4) of the storage subsystem 2000a (storage subsystem ID: S1). After Step S6303 is executed against these paths, every path (path ID: pa3, pa4) has "NO" for security setting. Therefore, a determination is made that no inconsistency is observed for the security setting.

When the path security setting is determined as inconsistent in Step S6304, the CPU 3200 creates a new entry to the path security setting confirmation log 3540. To the newly created entry, the processing result of "YES" is entered to tell that the path security setting is inconsistent (Step S6305). Exemplarily with the replica relationship table 3530 of FIG. 8, for the replica relationship identified by the replica relationship of ID1, created is such an entry as shown in the path security setting confirmation log 3540 of FIG. 9, identified by a log ID of "1".

When the path security setting is determined as not inconsistent in Step S6304, on the other hand, the CPU 3200 creates a new entry to the path security setting confirmation log 3540. To the newly created entry, the processing result of "NO" is entered to tell that the path security setting is not inconsistent (Step S6306). Exemplarily with the replica relationship table 3530 of FIG. 8, for the replica relationship identified by the replica relationship of ID2, created is such an entry as shown in the path security setting confirmation log 3540 of FIG. 9, identified by a log ID of "2".

After either Step S6305 or S6306 is through, the CPU 3200 regards the third target entry as having been processed (Step S6307), and the procedure returns to Step S6301. Then, after every entry in the replica relationship table 3530 is through with the process of Steps 6302 to 6307, the procedure ends the security consistency state verifying process.

Described next is an exemplary display screen in the path security confirming process.

FIG. 14 shows an exemplary screen displaying a button to accept an execution instruction for the path security confirming process, and a result summary of the process. In FIG. 14, a reference numeral 7002 denotes a confirmation button for the path security setting. To execute the above-described path security confirming process (flow of FIG. 10), the user uses the input unit 3400 to depress the confirmation button 7002 through operation of a cursor (not shown). A reference numeral 7003 denotes the processing result of the path security confirming process that is to be output in Step S6120 of FIG. 10. In this example, every entry of the replica relationship table 3530 is indicated by "YES" or "NO" for inconsistency of the path security setting. A reference numeral 7004 denotes a button for displaying the details of the path security setting determined as being inconsistent. The user depresses the button 7004 through operation of the cursor (not shown) to display the details of the path security setting determined as being inconsistent.

FIG. 15 shows an exemplary screen displaying the path security setting in detail with which inconsistency is discovered as "YES". In FIG. 15, a reference numeral 7005 denotes a region including paths for the volumes listed in the field 3532 of any target entry of the replica relationship table 3530, i.e., entry determined "YES" as being inconsistent. The region 7005 also shows the replica relationship among the volumes listed in the field 3533. The paths of the volumes can be identified by the path information acquired in the process of Step S6303 in FIG. 13. The replica relationship among the volumes is identified by information of the entries derived through search of the inner replica table 2420 and the remote replica table 2430 acquired from the storage subsystems 2000 in Step S6105 of FIG. 10 for any entry having the replica ID listed in the field 3533. For display on the region 7005, the CPU 3200 changes the paths in display shape based on the detailed path security setting, i.e., information about the field 2415, in the path information derived by the process of Step S6303 of FIG. 13. A reference numeral 7006 denotes a region for displaying, in list, the state of the path security setting of the volumes listed in the target entry of the replica relationship table 3530, i.e., entry determined "YES" as being inconsistent. A reference numeral 7007 denotes a change button for accepting a user's request for changing the path security setting in Step S6125 of FIG. 10. To change the path security setting indicated in the entry corresponding to the region 7006, the user uses the input unit 3400 to depress the change button 7007 through operation of the cursor (not shown). By looking at the screen displaying the detailed information, the user can change the path security setting.

As such, the first embodiment of the present invention is described. According to the present embodiment, when access is made among a plurality of volumes under the replica relationship, the storage manager has no more need to know in advance what replica relationship is established there among to see if the security level is retained in the same level. What is better, when access is made among a plurality of volumes under the replica relationship, it is easy to retain the same level of security level.

Second Embodiment

Described next is a second embodiment of the present invention.

1. System Configuration

Compared with the computer system of the first embodiment of FIG. 1, a computer system of the second embodiment has a difference of including a management computer 3000a as an alternative to the management computer 3000. This is the only difference from the computer system of the first embodiment.

Figures 16, 17:
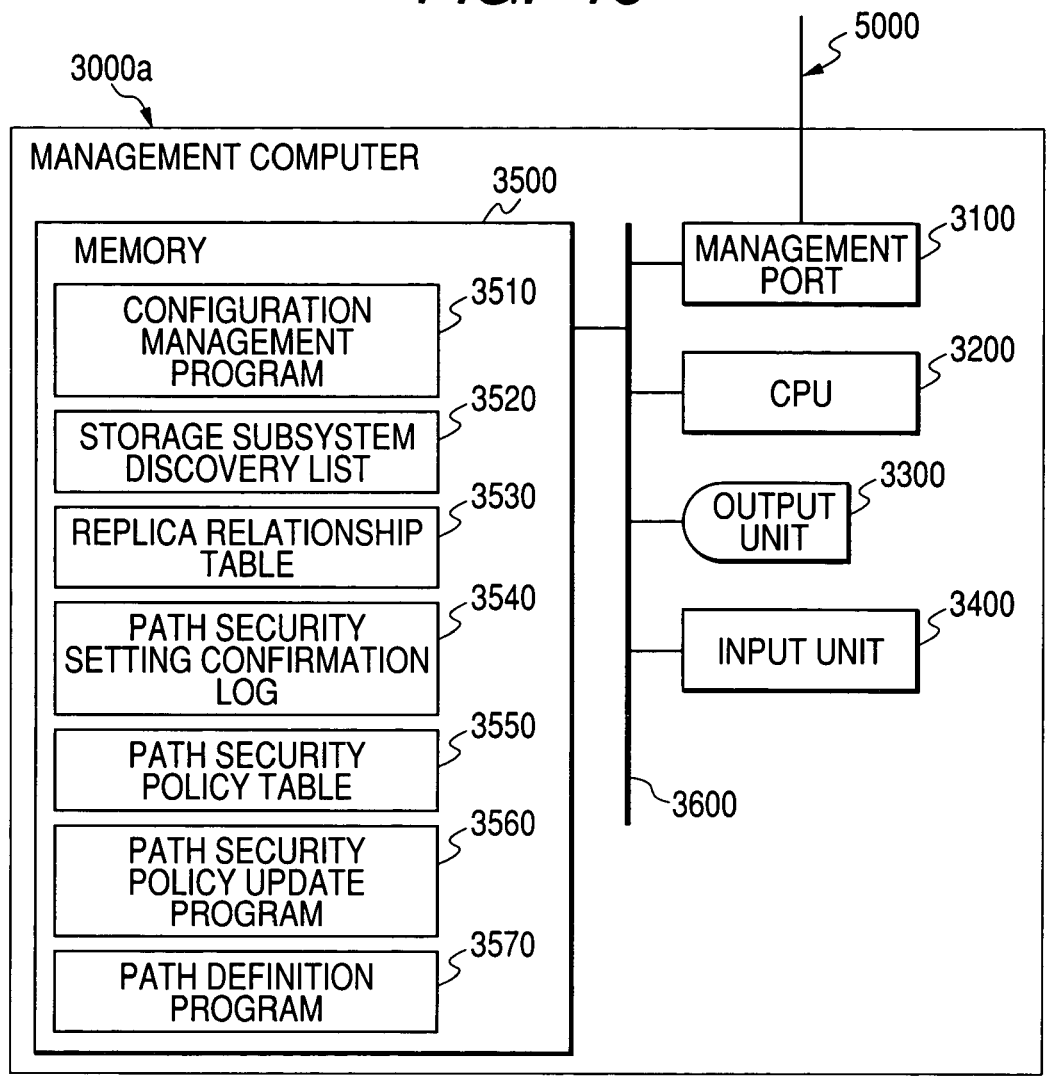

The management computer 3000a of the present embodiment goes through two processes in addition to the above-described path security confirming process when a user executes the replica configuration. That is, the process of reflecting the contents of the original path security policy to the replica path security policy, i.e., path security policy updating process, and the process of setting the security set to the original path to the replica path, i.e., path defining process. FIG. 16 is a schematic diagram of the management computer 3000a. As shown in the drawing, compared with the management computer 3000 of the first embodiment of FIG. 6, the memory 3500 of the management computer 3000a additionally includes a path security policy update program 3560, a path definition program 3570, and a path security policy table 3550. This is the only difference from the management computer 3000 of FIG. 6.

The path security policy table 3550 stores a path security policy for application to volume paths. FIG. 17 shows exemplary entry contents of the path security policy table 3550. As shown in the drawing, the path security policy table 3550 is provided with an entry for every volume available for the storage subsystem 2000. The entry has three fields 3551 to 3553. Specifically, the field 3551 lists storage subsystem IDs each being an identifier of the storage subsystem 2000 including a volume. The field 3552 lists volume IDs of the volumes, and the field 3553 lists path security policies for application to the paths of the volumes. Herein, to the field 3533, either a value "YES(IPsec)" or a value "NO" is entered. The value "YES(IPsec)" indicates that the volume path always needs security, and the value "NO" indicates not necessarily. This value setting is done in accordance with the user instruction accepted by the CPU 3200 through the input unit 3400.

2. Path Security Policy Updating Process

Figure 18:
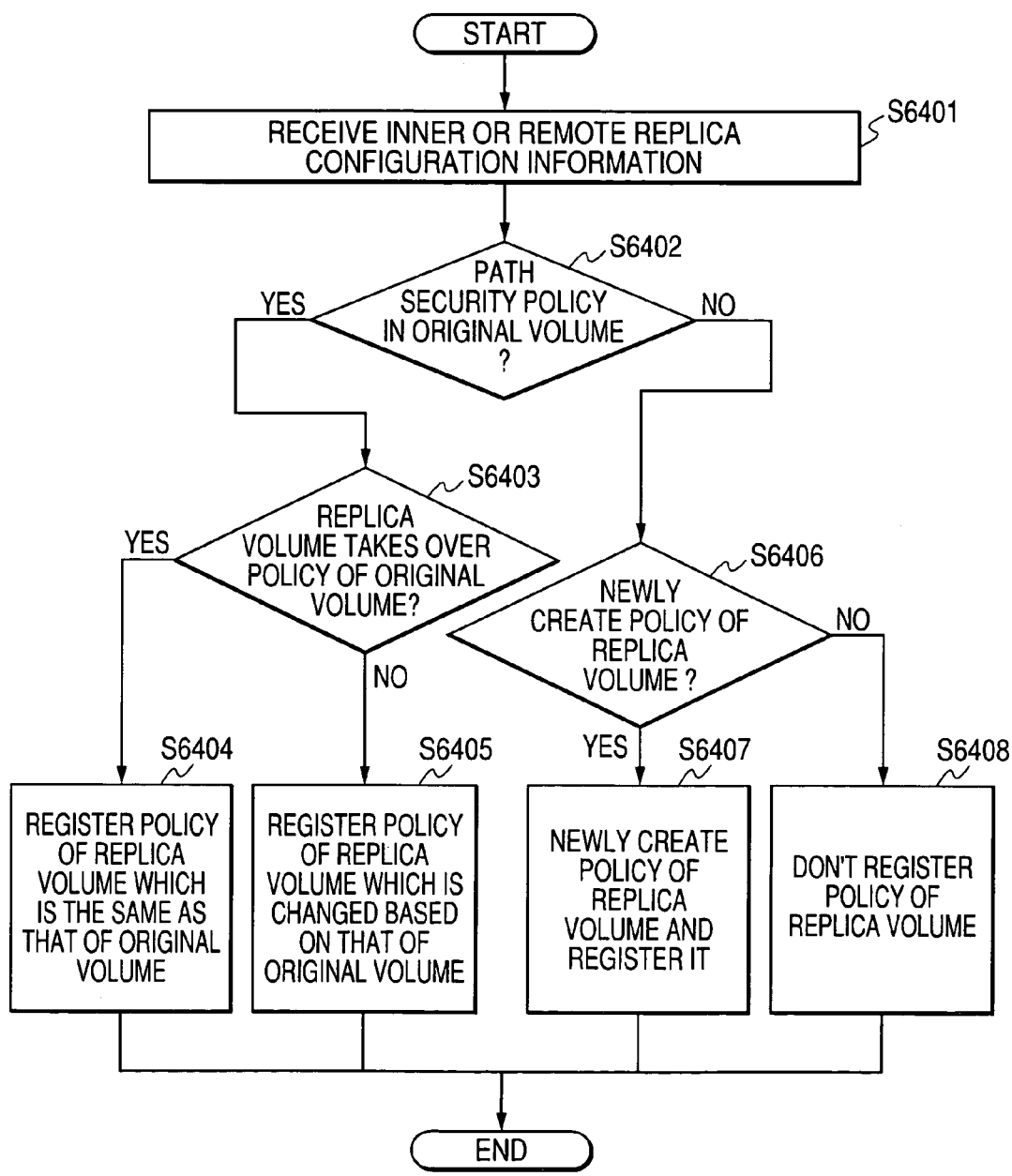

Described next is the path security policy updating process to be executed by the management computer 3000a. FIG. 18 is a flow diagram illustrating such a path security policy updating process. The flow is started responding to the CPU 3200 executing the path security update program 3560 stored in the memory 3500.

First, the CPU 3200 acquires from the user via the input unit 3400 inner replica configuration information or remote replica configuration information (Step S6401). To be specific, the inner replica configuration information and the remote replica configuration information mean a set of four values, i.e., a storage subsystem ID of the original storage subsystem 2000, a volume ID of the original volume, a subsystem ID of the replica storage subsystem 2000, and a volume ID of the replica volume.

Next, the CPU 3200 refers to the original volume of the replica configuration information received from the user to see if a path security policy is included therein (Step S6402). Here, using as keys the storage subsystem ID of the original storage subsystem 2000 and the volume ID of the original volume, the CPU 3200 may check the path security policy table 3550 whether if any entry showing value matching is included.

When the original volume is determined as including the path security policy in Step S6402, the CPU 3200 outputs a message to the output unit 3300 to receive the user's confirmation via the input unit 3400, whether or not to take over the path security policy of the original volume as a path security policy of the replica volume (Step S6403). If confirmed as taking over, the path security policy of the original volume is accordingly entered to the security policy table 3550 as a path security policy of the replica volume (Step S6404). In detail, a new entry is created to the path security policy table 3550 for copying thereto the entry contents of the original volume in the path security policy table 3550. Then, the storage subsystem ID and the volume ID of the new entry are changed into the storage subsystem ID of the replica storage subsystem and the volume ID of the replica volume. If confirmed as not taking over, on the other hand, an entry is accordingly newly created to the path security policy table 3550 for the replica volume in accordance with the user input. To thus newly created entry, the path security policy is entered (Step S6405). In an alternative manner, for such taking-over, the procedure may automatically go to Step S6404 by skipping Step S6403 of the user confirmation.

When the original volume is determined as not including the path security policy in Step S6402, the CPU 3200 outputs a message to the output unit 3300 to receive the user's confirmation via the input unit 3400, whether or not to newly create a path security policy for the replica volume (Step S6406). If confirmed as newly creating, the CPU 3200 accordingly creates a new entry to the security policy table 3550 for the replica volume by following the user input, and to the resulting new entry, the path security policy is entered (Step S6407). If confirmed as not newly creating, on the other hand, the procedure is terminated without creating the security policy for the replica volume (Step S6408). Alternatively, the procedure may go to Step S6408 by skipping Step S6406 of the user confirmation so as to store no replica volume.

Described next is an exemplary display screen in the path security policy updating process.

Figure 19:
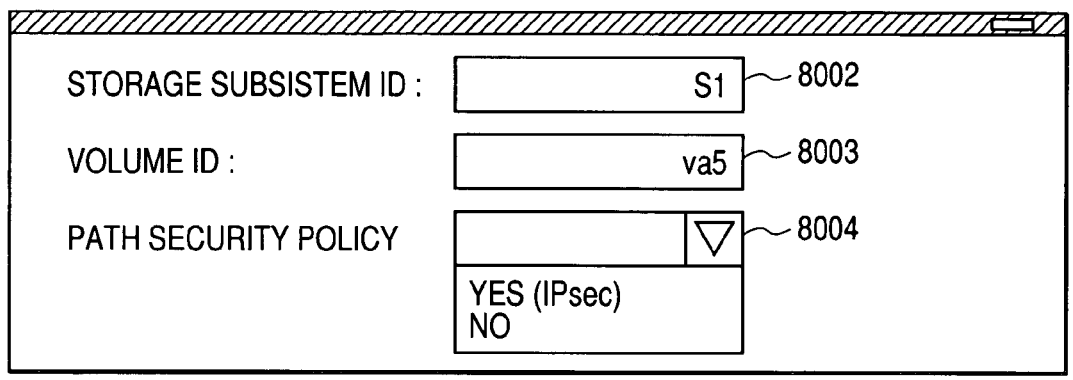
FIG. 19 is a diagram showing an exemplary screen for the path security policy to be set.

FIG. 19 shows an exemplary screen for the path security policy to be set. This screen is used in Steps 6405 and 6407 of FIG. 18 for storing the path security policy for a volume. In FIG. 19, a reference numeral 8002 denotes an input column (field) for listing a storage subsystem ID of the storage subsystem 2000 including a volume to which the path security policy is applied. A reference numeral 8003 denotes an input column for listing a volume ID of the volume. A reference numeral 8004 denotes an input column that is a pull-down menu to select therefrom "YES" and "NO" for the path security setting.

Figure 20:
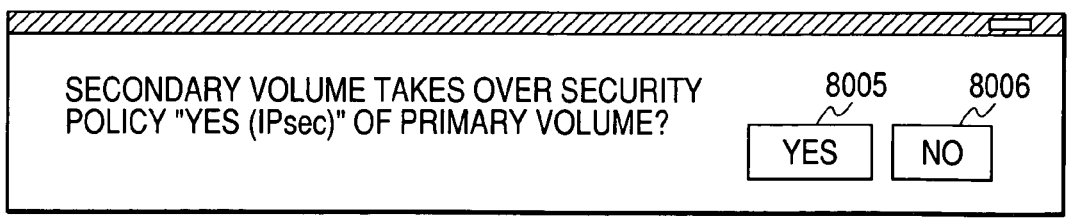
FIG. 20 is a diagram showing an exemplary screen for the path security setting to be taken over or not.

FIG. 20 shows an exemplary screen for accepting taking-over of the path security setting. This screen is used to inquire the user whether the path security policy of the original volume is to be taken over by the replica volume in Step S6403 of FIG. 18. In FIG. 20, a reference numeral 8005 denotes a button for making an instruction for taking-over, and a reference numeral 8006 denotes a button for making an instruction not for taking-over.

3. Path Defining Process

Described next is the path defining process to be executed by the management computer 3000a. Herein, the path defining process is equivalent to entry addition and change to the path table 2410 of the storage subsystem 2000. Changing the path table 2410 of the storage subsystem 2000 through execution of the path definition will change the setting of the volume in the storage subsystem 2000 available for the host computer 1000.

Figure 21:
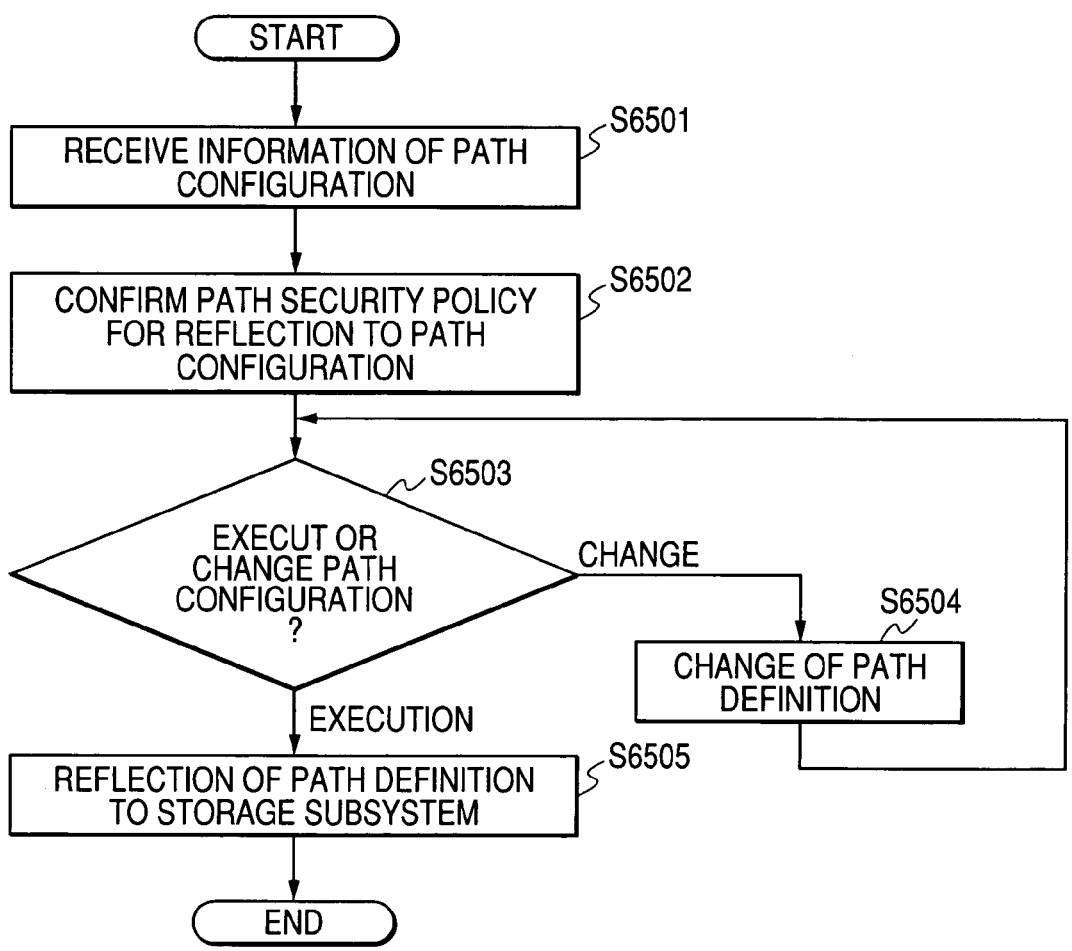

FIG. 21 is a flow diagram illustrating the path defining process to be executed by the management computer 3000a. This flow is started, in the management computer 3000a, responding to the CPU 3200 executing the path definition program 3570 stored in the memory 3500.

First, the CPU 3200 receives from a user path definition information via the input unit 3400 (Step S6501). The path definition information is including a storage subsystem ID of the storage subsystem 2000 for path definition, a port ID of a port executing the path definition, a volume ID of a volume executing the path definition, and LUN provided to the volume executing the path definition.

The CPU 3200 then refers to the volume in the path definition information to see whether or not a path security policy is included. Then, in accordance of the result, information telling "YES" or "NO" for path security setting is added to the path definition information (Step S6502). To be specific, using as keys the storage subsystem ID of the storage subsystem 2000 and the volume ID of the original volume included in the path definition information, the CPU 3200 may search the path security policy table 3550 for any entry showing value matching. If such an entry is found, the path definition information received from the user is provided with information telling "YES" or "NO" for the path security setting listed in the field 3533 of the entry. If no such entry is found, information provided to the path definition information is "NO" for the path security setting.

The CPU 3200 then displays the resulting path definition information including information telling "YES" or "NO" for the path security setting on a display device 3300 to accept a user's instruction either for executing the path definition or changing the path security setting (Step S6503). If the user's instruction is for changing the path security setting, the path definition information is changed from "YES" to "NO", or "NO" to "YES" (Step S6504), and then the procedure returns to Step S6503. If the user's instruction is for executing the path definition, the path table 2410 of the storage subsystem 2000 is changed in accordance with the path definition information to reflect the contents of the path definition to the storage subsystem 2000 (Step S6505). More in detail, the CPU 3200 forwards, via the management port 3100, to the storage subsystem 2000 identified by the storage subsystem ID in the path definition information, an instruction to execute the path definition together with the path definition information. Responding to such an instruction to execute the path definition from the management computer 3000 via the management port 2100, the controller 2300 of the storage subsystem 2000 searches the path table 2410 for an entry having the port ID, LUN, and volume ID included in the path definition information coming together with the instruction. If such an entry is found, the contents of the field 2415 of thus found entry are accordingly changed based on the information of the path security setting included in the path definition information. If no such entry is found, the path table 2410 is newly created with an entry having a unique path ID, and to the new entry, the information in the path definition information is entered, i.e., port ID, LUN, volume ID, and "YES" or "NO" for the path security setting. In an alternate manner, to reflect the path definition contents to the storage subsystem 2000, the procedure may automatically go to Step S6505 by skipping S6503 for user confirmation.

Described next is an exemplary display screen in the path defining process.

Figure 22:
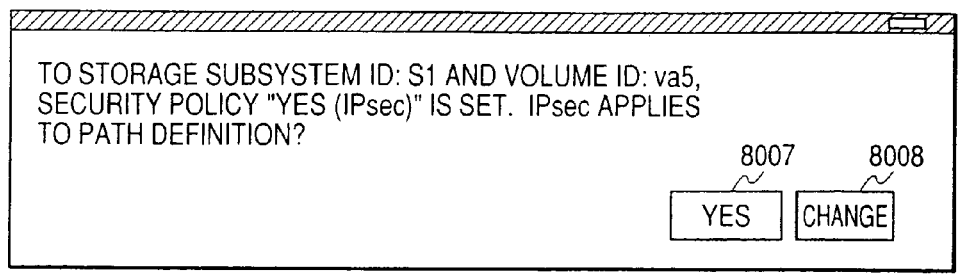
FIG. 22 is a diagram showing an exemplary screen for executing or changing the path definition.
Figure 23:
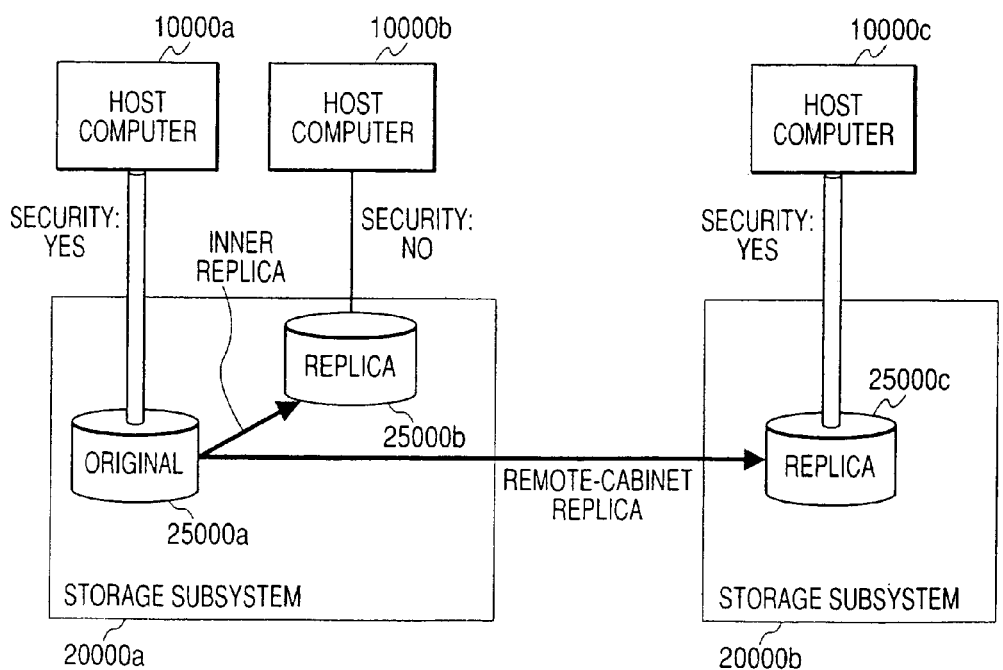
FIG. 23 is a diagram for illustrating problems of the conventional technology.

FIG. 22 shows an exemplary screen for accepting an instruction for executing and changing the path definition. This screen is used to inquiry the user whether the path definition is to be executed or changed in Step S6503 of FIG. 21. In FIG. 22, a reference numeral 8007 is a button for making an instruction to execute the path definition, and a reference numeral 8008 is a button for making an instruction to change the path definition.

As such, the second embodiment of the present invention is described. According to the present embodiment, with a path security policy set to a volume in advance, a storage manager can automatically secure the same level of security when making access to a replica of the volume.

While the invention has been described in detail, the foregoing description is in all aspects illustrative and not restrictive. It is understood that numerous other modifications and variations can be devised without departing from the scope of the invention. For example, when no path security confirming process is executed in the second embodiment, there is no need for the configuration management program 3510, the replica relationship table 3530, and the path security setting confirmation log 3540 in the management computer 3000. In the above embodiments, the path security set to volumes is IPsec defined by RFC2401. This is surely not restrictive, and a LUN security protocol is also an option. The present invention is considered suitable for configuration management of a large number of volumes in a large-sized data center.

According to these above embodiments, to check if the security level is retained in the same level when a replica volume is accessed, a storage manager has no more need to know what replica volume an original volume includes.

Moreover, with a path security policy set to the original volume in advance, the storage manager can automatically secure the same level of security when the replica volume is accessed. In the above embodiment, consistency verification can be easily done for the security setting of the original and replica volumes. These above embodiments support the security setting.

What is claimed is:

1. A configuration management method of a computer system including a first computer and a second computer and a first storage system which provides a first volume to the first computer and a second storage system which provides a second volume to the second computer, comprising the steps of:

collecting, from the first storage system and the second storage system, relationship information indicating a relationship between the first volume and the second volume and first path information indicating security information related to a path between the first computer and the first volume, and first path information indicating security information related to a path between the second computer and the second volume, respectively;

specifying the first volume and the second volume related to the first volume, on the basis of the relationship information;

comparing the first path information related to a path between the first computer and the first volume with the first path information related to a path between the second computer and the second volume;

outputting the result of comparison; and collecting second path information indicating security information related to a path between the first volume and the second volume related to the first volume, wherein the step of comparing further compares the first path information and the second path information.

2. The configuration management method according to claim 1, wherein the second volume is a replica volume of the first volume.

3. The configuration management method according to claim 1, further comprising the steps of:

sending replicated data of data in the first volume from the first storage system to second storage system via the path between the first volume and the second volume; and storing the replicated data to the second volume.

4. The configuration management method according to claim 1, wherein the security information includes a level of security of a path between the computer and the volume or between the first volume and the second volume, wherein the step of comparing compares a level of security information between a plurality of the first path information, one of which is between the first computer and the first volume and another of which is between the second computer and the second volume.

5. The configuration management method according to claim 4, comprising the steps of:

changing, if the levels of the security information are different between plurality of the first path information, a level of the security information of the first path information related to the first computer and the first volume according to the another security information of the first path information related to the second computer and the second volume.

6. The configuration management method according to claim 1, wherein the security information including a level of security of a path between the first computer and the first volume or between the first volume and the second volume related to the first volume, wherein the step of comparing compares level of security information between the first path information and the second path information.

7. The configuration management method according to claim 6, further comprising the steps of:

changing, if the levels of the security information are different between the first path information and the second path information, a level of the security information of the first path information according to the second path information.

8. A configuration management method in a computer system including a first computer and a second computer and a first storage system which provides a first volume to the first computer and a second storage system which provides a second volume to the second computer, comprising the steps of:

collecting a relationship between the first volume and the second volume storing replicated data to be stored in the first volume;

collecting security information for an a first access path between the first volume and the first computer;

setting security information for a first access path between the second computer and the second volume as a replica volume on the basis of the security information related to the original volume and a relationship between the first volume and the second volume;

collecting second access path information indicating security information related to a path between the first volume and the second volume related to the first volume;

comparing the first access path information and the second access path information; and outputting the result of comparison.

\* \* \* \* \*